(12) United States Patent
Mori (10) Patent No.: US 8,305,445 B2
(45) Date of Patent: Nov. 6, 2012

(54) LANE MARKER RECOGNIZING APPARATUS

(75) Inventor: Naoki Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 844 days.

(21) Appl. No.: 12/406,650

(22) Filed: Mar. 18, 2009

(65) Prior Publication Data

US 2009/0268026 A1 Oct. 29, 2009

(30) Foreign Application Priority Data

Apr. 23, 2008 (JP) ................................. 2008-112240

(51) Int. Cl.
*H04N 9/11* (2006.01)
*G06K 9/00* (2006.01)

(52) U.S. Cl. ........................................ 348/148; 382/104

(58) Field of Classification Search .......... 348/148–149; 382/104
See application file for complete search history.

(56) References Cited

U.S. PATENT DOCUMENTS

| | | | | |
|---|---|---|---|---|
| 7,295,683 B2* | 11/2007 | Yamamoto et al. | ............ | 382/104 |
| 7,346,190 B2* | 3/2008 | Taniguchi et al. | ............ | 382/104 |
| 2003/0103650 A1* | 6/2003 | Otsuka et al. | ................. | 382/104 |
| 2004/0042638 A1* | 3/2004 | Iwano | ............................ | 382/104 |
| 2004/0102884 A1* | 5/2004 | Tange et al. | ...................... | 701/48 |
| 2005/0135658 A1* | 6/2005 | Yamamoto et al. | ........... | 382/104 |
| 2005/0256636 A1* | 11/2005 | Miyashita et al. | ............ | 701/207 |
| 2008/0273750 A1* | 11/2008 | Fujimoto | ...................... | 382/103 |

FOREIGN PATENT DOCUMENTS

JP 2003-317106 A 11/2003

* cited by examiner

*Primary Examiner* — Joshua Joo
(74) *Attorney, Agent, or Firm* — Arent Fox LLP (57) ABSTRACT

A lane marker recognizing apparatus which recognizes stud-type lane markers from acquired road image includes a candidate region extracting means for extracting a region having the possibility of being an image portion of the lane marker, from the road image, as a lane marker candidate region, a real space representative point calculating means for determining a representative point of the lane marker candidate region according to a predetermined condition, and calculating a real space position corresponding to the representative point as a real space representative point, a grouping means for forming one group of the real space candidate points having a relative distance within a predetermined range set according to standards on the lane marker, and a lane marker position recognizing means for recognizing the position of the lane marker based on the real space representative point formed into one group by the grouping means.

7 Claims, 7 Drawing Sheets

LANE MARKER RECOGNIZING APPARATUS

BACKGROUND OF THE INVENTION

1. Field of the Invention

The present invention relates to a lane marker recognizing apparatus, a vehicle, and a lane marker recognizing program having a function of recognizing stud-type lane markers discretely provided on a road.

2. Description of the Related Art

Conventionally, there is known a lane marker recognizing apparatus which recognizes lane markers for dividing a traffic lane provided on a road on the basis of an image data acquired by an in-vehicle camera which captures an image of the road ahead of the vehicle. As the lane markers provided on the road, there are used linear lane markers such as lane boundary lines (white lines) and stud-type lane markers which are discretely provided such as Botts Dots (Nonretroreflective Raised Pavement Marker) or cat's eyes (Retroreflective Raised Pavement Marker).

Note that the linear lane markers can be detected by a straight line extraction technique such as a Hough transform while the stud-type lane markers cannot be detected by the straight line extraction technique. Therefore, there has been suggested a lane marker recognizing apparatus capable of detecting stud-type lane markers by using a pattern matching technique (for example, refer to Japanese Laid-Open No. 2003-317106).

The use of the pattern matching technique, however, has a problem in that when there are objects of a shape similar to the reference shape for pattern matching exists on the road, there is a fear that the same is falsely recognized as the image portion of the lane marker.

SUMMARY OF THE INVENTION

An object of the present invention is to provide a lane marker recognizing apparatus, a vehicle, and a lane marker recognizing program which could improve recognition accuracy of the stud-type lane markers discretely provided on a road.

The present invention has been made in view of the above object, and the lane marker recognizing apparatus of the present invention is equipped with an image acquiring means for acquiring road image via an imaging means mounted on a vehicle, and recognizes stud-type lane markers discretely provided on the road from the acquired road image.

The lane marker recognizing apparatus of the present invention comprises: a candidate region extracting means for extracting a region having the possibility of being an image portion of the lane marker, from the road image, as a lane marker candidate region; a real space representative point calculating means for determining a representative point of the lane marker candidate region in accordance with a predetermined condition, and calculating a real space position corresponding to the representative point as a real space representative point; a grouping means for forming, in the case where a plurality of the real space representative points is calculated, one group of a plurality of the real space representative points having a relative distance within a predetermined range set according to standards on the lane marker; and a lane marker position recognizing means for recognizing the position of the lane marker on the basis of a plurality of the real space representative points formed into one group by the grouping means.

According to this invention, the lane marker candidate region is extracted by the candidate region extracting means, and the real space position corresponding to the representative point of the lane marker candidate region is calculated as the real space representative point by the real space representative point calculating means. Then, the real space representative points having the relative distance within the predetermined range is formed into one group by the grouping means. Here, the stud-type lane markers (Botts Dots, cat's eye, etc.) discretely provided on the road are provided with a constant interval according to regulation (road law and the like). Therefore, the real space representative points formed into one group could be determined as having high possibility of being the position of the lane markers provided discretely.

On the other hand, those real space representative points not included in the group has high possibility of being the position of objects or the like other than the lane marker. Thus, by recognizing the position of the lane marker with the lane marker position recognizing means on the basis of the real space representative points formed into one group by the grouping means, the position of the lane marker can be recognized with good accuracy, while preventing position of objects other than lane marker from being erroneously identified as the position of the lane marker.

Further, in the lane marker recognizing apparatus of the present invention, the grouping means forms, on condition that the relative distance of the real space representative points is within the predetermined range set according to the standards on the lane marker and that three or more real space representative points are aligned in one direction, one group consisting of the three or more real space representative points.

According to this invention, the representative points are grouped by the grouping means on condition that three or more representative points aligned in the same direction exists, therefore the case where the lane marker position is recognized on the basis of the real space representative point which has no consistency in its directionality and has low possibility of being the position of the lane marker may be prevented.

Still further, the lane marker recognizing apparatus of the present invention comprises a coefficient of determination calculating means for obtaining a polynomial equation of a predetermined order which approximates a dot sequence of the real space representative points formed into one group by the grouping means to a straight line or a curved line, and calculating a coefficient of determination which is the coefficient indicating the degree of approximation of the dot sequence of the real space representative points by the polynomial equation, and the lane marker position recognizing means recognizes the position of the lane marker, on the basis of a plurality of the real space representative points constituting the group having the coefficient of determination equal to or greater than a predetermined value.

According to this invention, because the lane markers are provided in a linear fashion or in a curved fashion, it is assumed that the real space representative points calculated on the basis of the image portion of the lane marker are scattered in a linear fashion or in a curved fashion. Therefore, by obtaining the polynomial equation of a predetermined order which approximates a dot sequence of the real space representative points formed into one group by the grouping means to a straight line or a curved line, and calculating the coefficient of determination which is the coefficient indicating the degree of approximation of the dot sequence of the representative points by the polynomial equation with the coefficient of determination calculating means, the lane marker position recognizing means recognizes the position of the lane marker on the basis of a plurality of the real space reference points constituting the group having the coefficient of determination equal to or greater than a predetermined value, so that the recognition accuracy of the position of the lane marker may be improved by excluding the groups comprised of real space representative points having low linearity or curvilinearity.

Still further, the lane marker recognizing apparatus of the present invention comprises a group centroid calculating means for calculating a centroid of the group, and the lane marker position recognizing means recognizes the position of the lane markers, in the case where there exists a plurality of groups having a same number of the real space representative points constituting the group and where a distance between the centroid of the groups is equal to or greater than a first threshold and is less than a second threshold, on the basis of the real space representative points constituting the plurality of the groups.

According to this invention, the stud-type lane markers discretely provided are generally defined so that groups comprised of a predetermined number of lane markers provided at a predetermined interval are arranged at a predetermined interval. Therefore, in the case where there exists a plurality of groups having the same number of the real space representative points constituting the group and the distance between the centroid of the groups is equal to or greater than the first threshold and is less than the second threshold, the lane marker position recognizing means recognizes the position of the lane markers on the basis of the real space representative points constituting such plurality of the groups. By doing so, the position of the lane marker may be determined more accurately by excluding the real space representative point on the basis of the image portion other than the lane marker.

Still further, in the lane marker recognizing apparatus of the present invention, the real space representative point determining means sets as the predetermined condition a condition of selecting a pixel having the highest luminance value among the pixels constituting each lane marker candidate region as the representative point.

According to the present invention, it is assumed that the area in the image portion of the lane marker having the highest luminance value will be specified in accordance with the shape of the lane marker. Therefore, by setting the predetermined condition of selecting a pixel having the highest luminance value among the pixels constituting each lane marker candidate region as the representative point by the real space representative point determining means, the specified position in each of the lane marker candidate region may be commonly set as the representative point.

Still further, in the lane marker recognizing apparatus of the present invention, the real space representative point determining means sets as the predetermined condition a condition of selecting a pixel constituting the centroid of each lane marker candidate region as the representative point.

According to the present invention, the centroid of the image portion of the lane marker is specified in accordance with the shape of the lane marker. Therefore, by setting the predetermined condition of selecting a pixel constituting the centroid of each lane marker candidate region as the representative point by the real space representative point determining means, the specified position in each of the lane marker candidate region may be commonly set as the representative point.

Next, a vehicle of the present invention relates to a vehicle equipped with an imaging means and an image acquiring means for acquiring road image via the imaging means, and recognizes stud-type lane markers discretely provided on the road from the acquired road image.

The vehicle of the present invention comprises a candidate region extracting means for extracting a region having the possibility of being an image portion of the lane marker, from the road image, as a lane marker candidate region; a real space representative point calculating means for determining a representative point of the lane marker candidate region in accordance with a predetermined condition, and calculating a real space position corresponding to the representative point as a real space representative point; a grouping means for forming, in the case where a plurality of the real space representative points are calculated, one group of a plurality of the real space representative points having a relative distance within a predetermined range set according to a standard of the lane marker; and a lane marker position recognizing means for recognizing the position of the lane marker on the basis of a plurality of the real space representative points formed into one group by the grouping means.

According to the present invention, as with the lane marker recognizing apparatus according to the present invention explained above, by recognizing the position of the lane marker with the lane marker position recognizing means on the basis of the real space representative points formed into one group by the grouping means, the position of the lane marker can be recognized with good accuracy, while preventing position of objects other than lane marker from being erroneously identified as the position of the lane marker.

Next, a program of the present invention relates to a lane marker recognizing program for recognizing stud-type lane markers discretely provided on a road from a road image, with a computer equipped with a means for accessing data of road image acquired via an imaging means mounted on a vehicle.

According to the program of the present invention, the program makes the computer function as a candidate region extracting means for extracting a region having the possibility of being an image portion of the lane marker, from the road image, as a lane marker candidate region; a real space representative point calculating means for determining a representative point of the lane marker candidate region in accordance with a predetermined condition, and calculating a real space position corresponding to the representative point as a real space representative point; a grouping means for forming, in a case where a plurality of the real space representative points are calculated, one group of a plurality of the real space candidate points having a relative distance within a predetermined range set according to a standard of the lane marker; and a lane marker position recognizing means for recognizing the position of the lane marker on the basis of a plurality of the real space representative points formed into one group by the grouping means.

By making the computer execute the lane marker recognizing program of the present invention, the candidate region extracting means, the real space representative point determining means, the grouping means, and the lane marker position recognizing means in the lane marker recognizing apparatus and the vehicle of the present invention explained above may be configured.

DESCRIPTION OF THE PREFERRED EMBODIMENT

Figure 1:
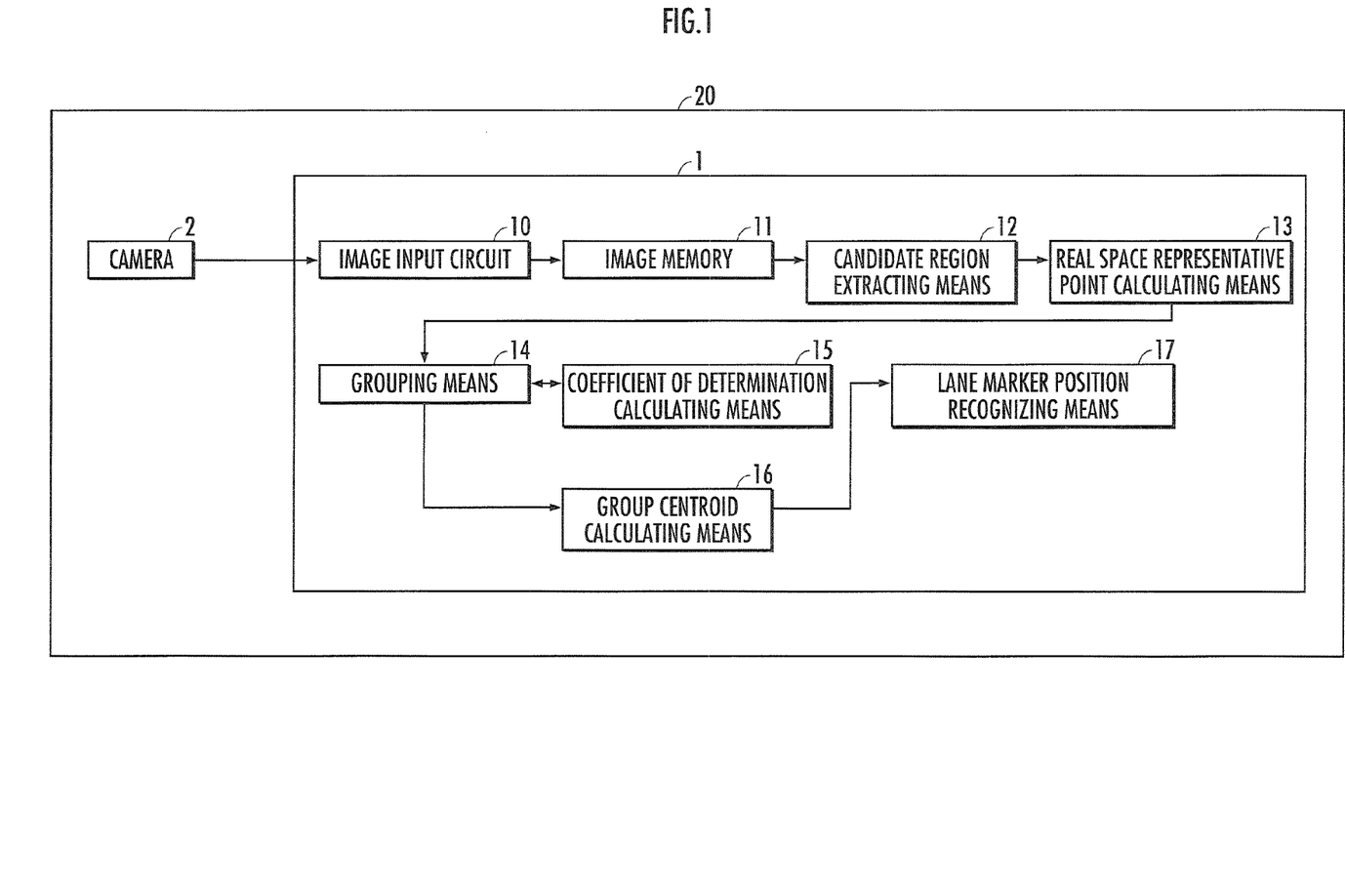
FIG. 1 is a functional block diagram of the lane marker recognizing apparatus of the present invention.

An example of a preferred embodiment of the present invention will now be described with reference to FIGS. 1 through 7. With reference to FIG. 1, a lane marker recognizing apparatus 1 is used by being mounted on a vehicle 20 (a vehicle of the present invention), and recognizes the position of the Botts Dots (corresponds to a stud-type lane marker of the present invention) discretely provided on a road for dividing the traffic lane, from a road image acquired by a camera 2 (corresponds to an imaging means of the present invention) which takes an image of the road ahead of the vehicle.

The lane marker recognizing apparatus 1 is an electronic unit constituted from a microcomputer (corresponds to a computer of the present invention) or the like, and the microcomputer functions as a candidate region extracting means 12, a real space representative point calculating means 13, a grouping means 14, a coefficient of determination calculating means 15, a group centroid calculating means 16, and a lane marker position recognizing means 17, by making the microcomputer execute a lane marker recognizing program of the present invention.

Further, the lane marker recognizing apparatus 1 is equipped with an image input circuit 10 for inputting a video signal output from the camera 2 and stores the same in an image memory 11. Here, the image input circuit 10 and the image memory 11 constitutes an image acquiring means of the present invention.

Next, with reference to FIG. 3, the execution procedure of the recognition process of the Botts Dots by the lane marker recognizing apparatus 1 will be explained according to the flow chart indicated in FIG. 2. The lane marker recognizing apparatus 1 repeatedly executes the flow chart indicated in FIG. 2 for each predetermined control cycle, and recognizes the Botts Dots.

Figure 2:
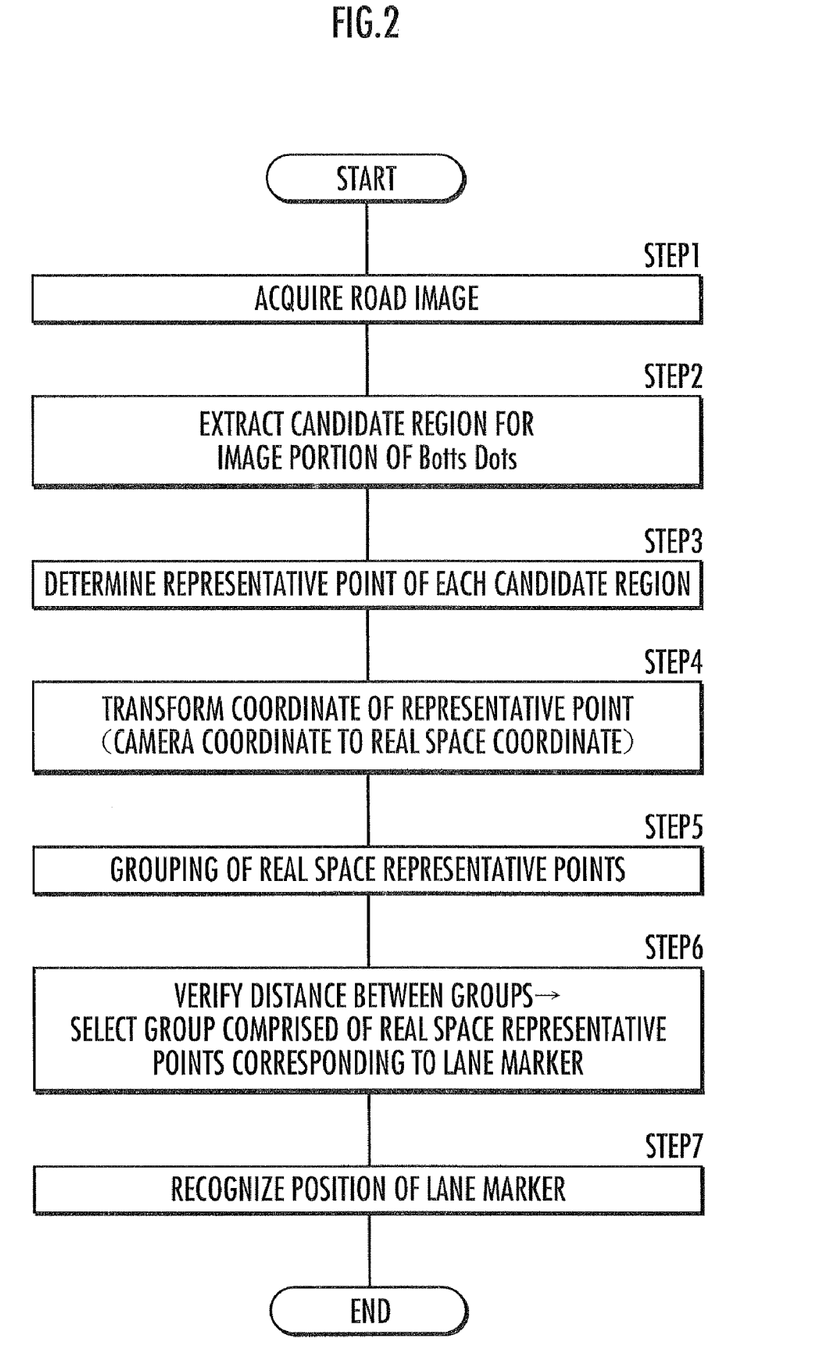
FIG. 2 is a flow chart showing the recognition process of the Botts Dots by the lane marker recognizing apparatus.

STEP 1 in FIG. 2 is a process by the image input circuit 10. The image input circuit 10 inputs the video signal output from the camera 2 and converts the same to a digital data, and stores the data in the image memory 11 as a data of a road image IM1, as shown in (a) in FIG. 3.

Next, STEP 2 is a process by the candidate region extracting means 12. The candidate region extracting means 12 extracts from an image IM2, which is obtained by applying a process for emphasizing luminous small regions or the like to the road image IM1 as shown in (b) in FIG. 3, a region Ea having the possibility of being an image portion of Botts Dots, as a candidate region for the image portion of the lane marker. In (b) in FIG. 3, reference Ea is representatively applied only to one region.

Next, STEP 3 and 4 are processes by the real space representative point calculating means 13. The real space representative point calculating means 13 searches for the pixel which has the highest luminance value from each of the candidate regions, and determines the same as the representative point of each candidate region. Then, in STEP 4, the real space representative point calculating means 13 calculates the point Dr, which is obtained by transforming the camera coordinate of the representative point of each of the candidate regions into a real space coordinate RC1, as shown in (c) in FIG. 3, as the real space representative point.

Next, STEP 5 is a process by the grouping means 14. The grouping means 14 forms three to four real space representative points aligned at even interval into one group, as shown in (d) in FIG. 3. In the case of (d) in FIG. 3, four groups, G1 through G4, are formed.

Next, STEP 6 is a process by the coefficient of determination calculating means 15 and the group centroid calculating means 16. The coefficient of determination calculating means 15 calculates the coefficient of determination which indicates the linearity of the real space representative points constituting the group (details to be discussed later), for each of the groups. Further, the group centroid calculating means 16 calculates the centroid of each group.

Next, STEP 7 is a process by the lane marker position recognizing means 17. The lane marker position recognizing means 17 evaluates the distance between the centroids of adjacent groups and the linearity of the dot sequence of the real space representative points constituting the group, as shown in (e) in FIG. 3, and determines whether each group corresponds to Botts Dots or not.

Figure 3:
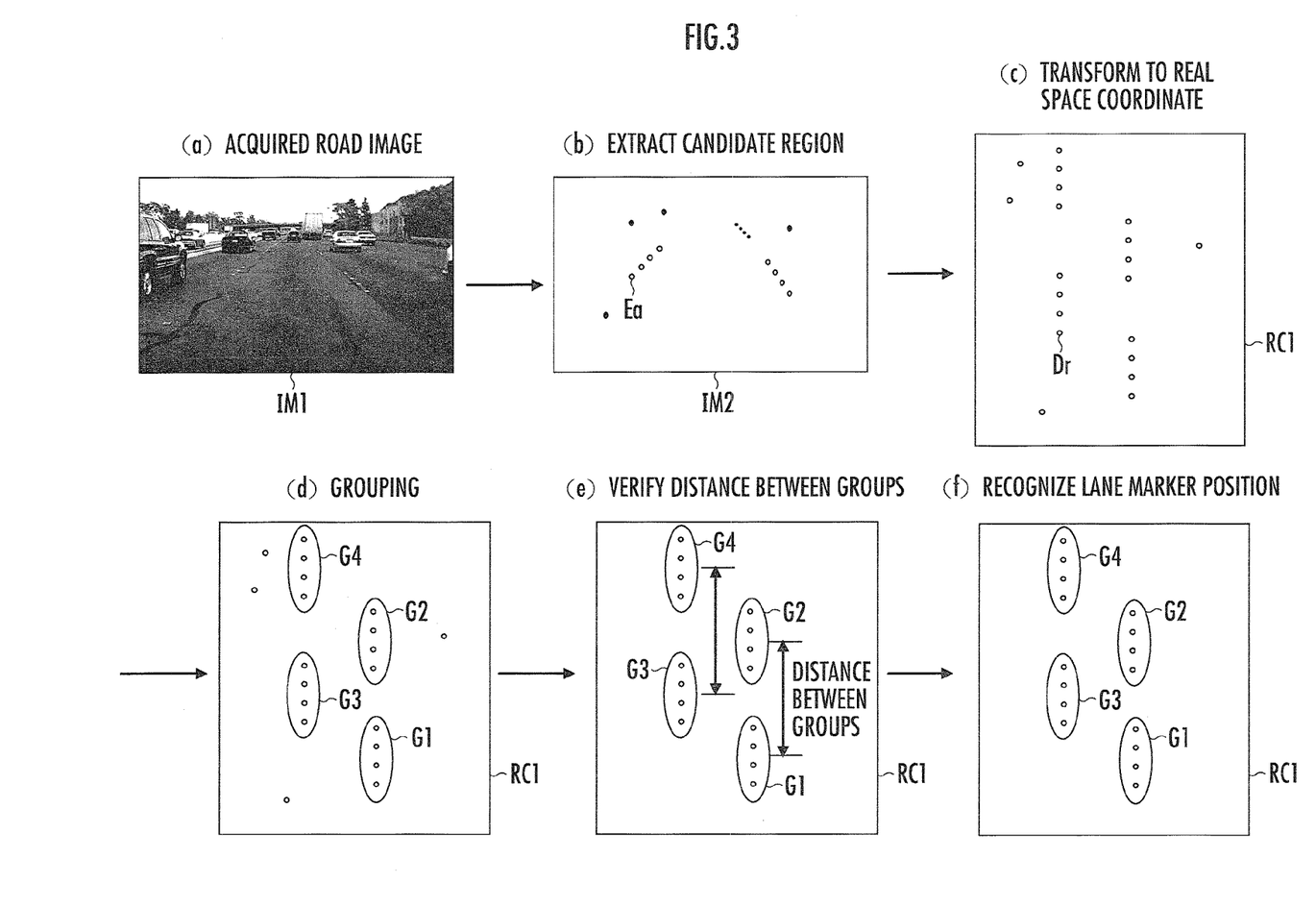
FIG. 3 is an explanatory view indicating the outline of the recognition process of the Botts Dots by the lane maker recognizing apparatus.

In the case of (e) in FIG. 3, all of the four groups G1 through G4 are determined as corresponding to Botts Dots, and as indicated in (f), the lane marker position determining means 17 recognizes the real space position of the Botts Dots on the basis of the position of the representative points constituting the four groups G1 through G4.

Hereinafter, with reference to FIGS. 4 through 7, the process of STEP 2 through STEP 7 of FIG. 2 explained above will be explained further in detail.

First, with reference to FIG. 4, the extraction process of the candidate region for image portion of the lane marker in STEP 2, and the determination process of the representative point of each candidate region in STEP 3 will be explained.

Figure 4:
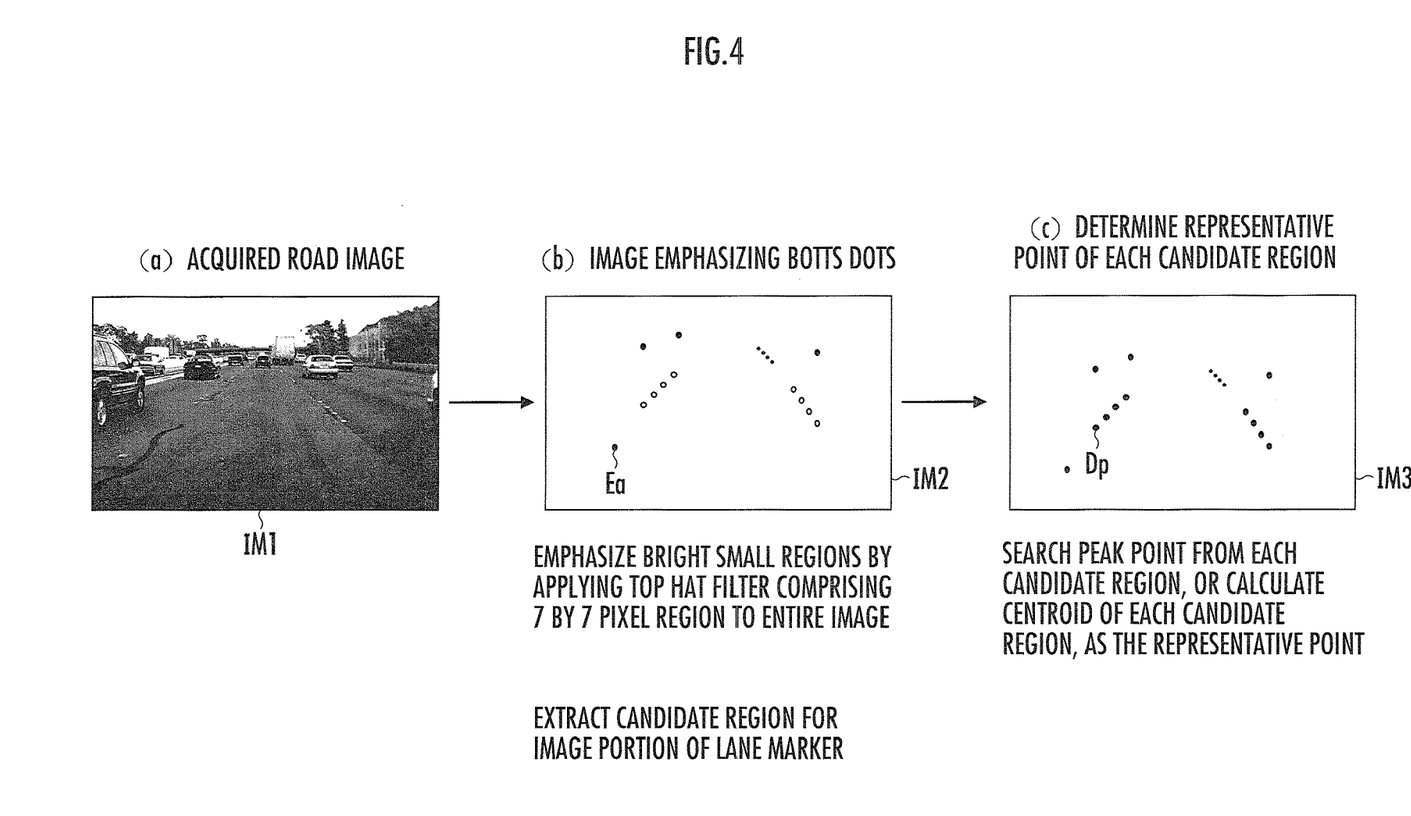
FIG. 4 is an explanatory view of the extraction process of the candidate region for the image portion of the lane marker.

The candidate region extracting means 12 applies a top hat filter constituted from a 7 by 7 pixel region to the road image IM1 indicated in (a) in FIG. 4, and generates the image IM2 which emphasizes high luminance small regions. Thereafter, the image portion Ea satisfying the condition set on the basis of the shape and size of the Botts Dots is extracted from IM2 as the candidate region for the image portion of the lane marker. In the case of (b) in FIG. 4, sixteen candidate regions are extracted.

Here, the size of the region of the top hat filter is set according to the number of pixels or the angle of view of the lens or the like of the camera 2. Further, it may be set that the size of the region of the top hat filter is changed between the near side of the image (acquired image range on the side closer to the vehicle) and the far side of the image (acquired image range on the side father from the vehicle). In this case, to match the size of the image portion of the Botts Dots which becomes smaller as the same is shifted towards the far side of the image (moves away from the vehicle), the size of the region of the top hat filter is made smaller as the same is shifted towards the far side of the image. By doing so, the image portion of the Botts Dots having high luminance can be emphasized effectively.

Next, the real space representative point calculating means 13, as shown in (c) in FIG. 4, searches for the pixel which has the largest luminance value from each of the candidate regions extracted, and determines the pixel having the highest luminance value as the representative point Dp of the candidate region. Here, the centroid of each candidate region may be determined as the representative point Dp.

Next, the transformation process from the camera coordinate to the real space coordinate in STEP 4 will be explained with reference to FIG. 5.

Figure 5:
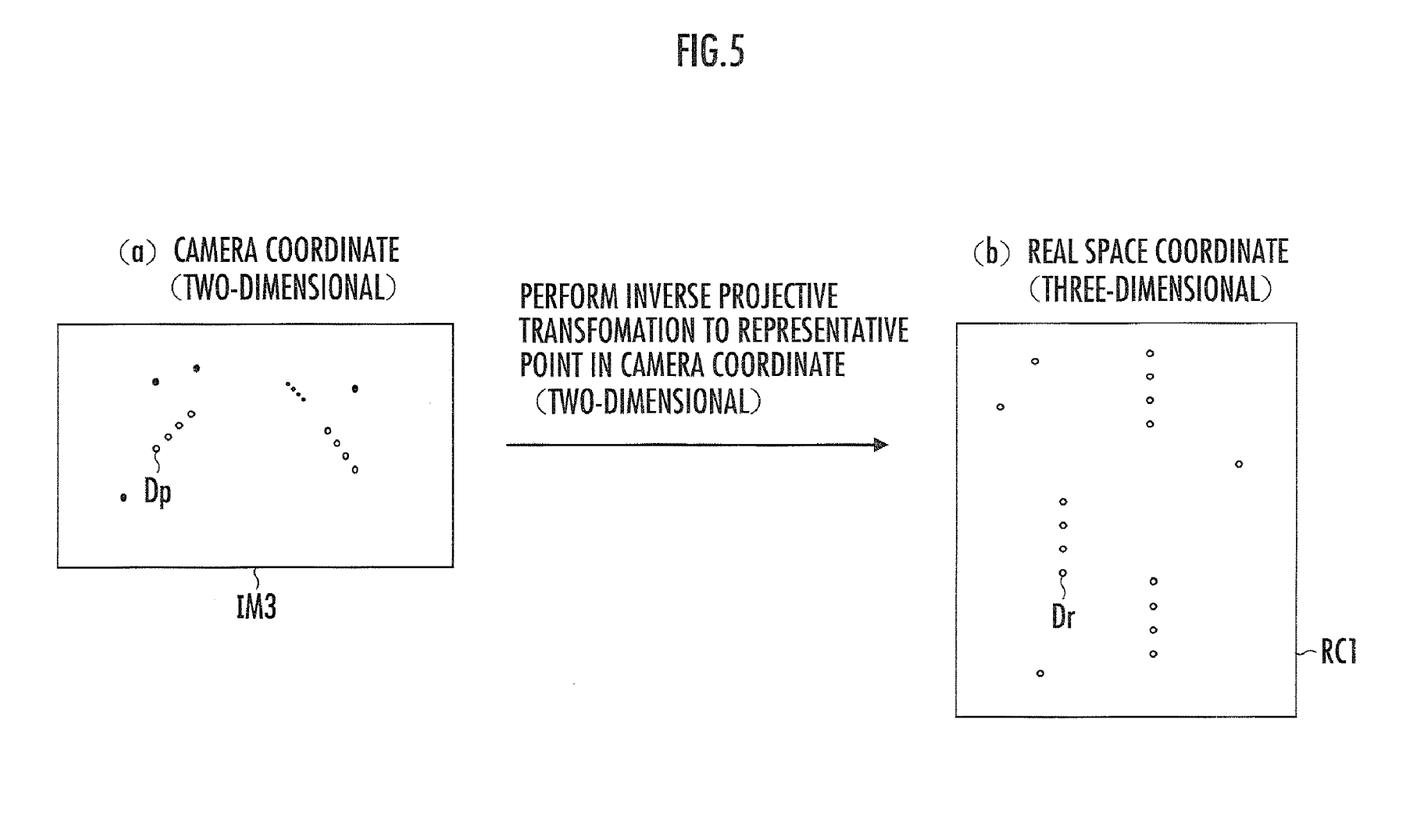
FIG. 5 is an explanatory view of the transformation process from the camera coordinate to the real space coordinate.

The real space representative point calculating means 13 carries out calculation of inverse projective transformation from the camera coordinate to the real space coordinate, to the representative point Dp of each candidate region in the camera coordinate of the image IM3 indicated in (a) of FIG. 5. Then, the real space representative point calculating means 13 calculates the position of the real space representative point Dr in real space coordinate RC1 which corresponds to the representative point Dp, as shown in (b) in FIG. 5.

Next, with reference to FIG. 6, explanation will be given on the process of grouping in STEP 5.

Figure 6:
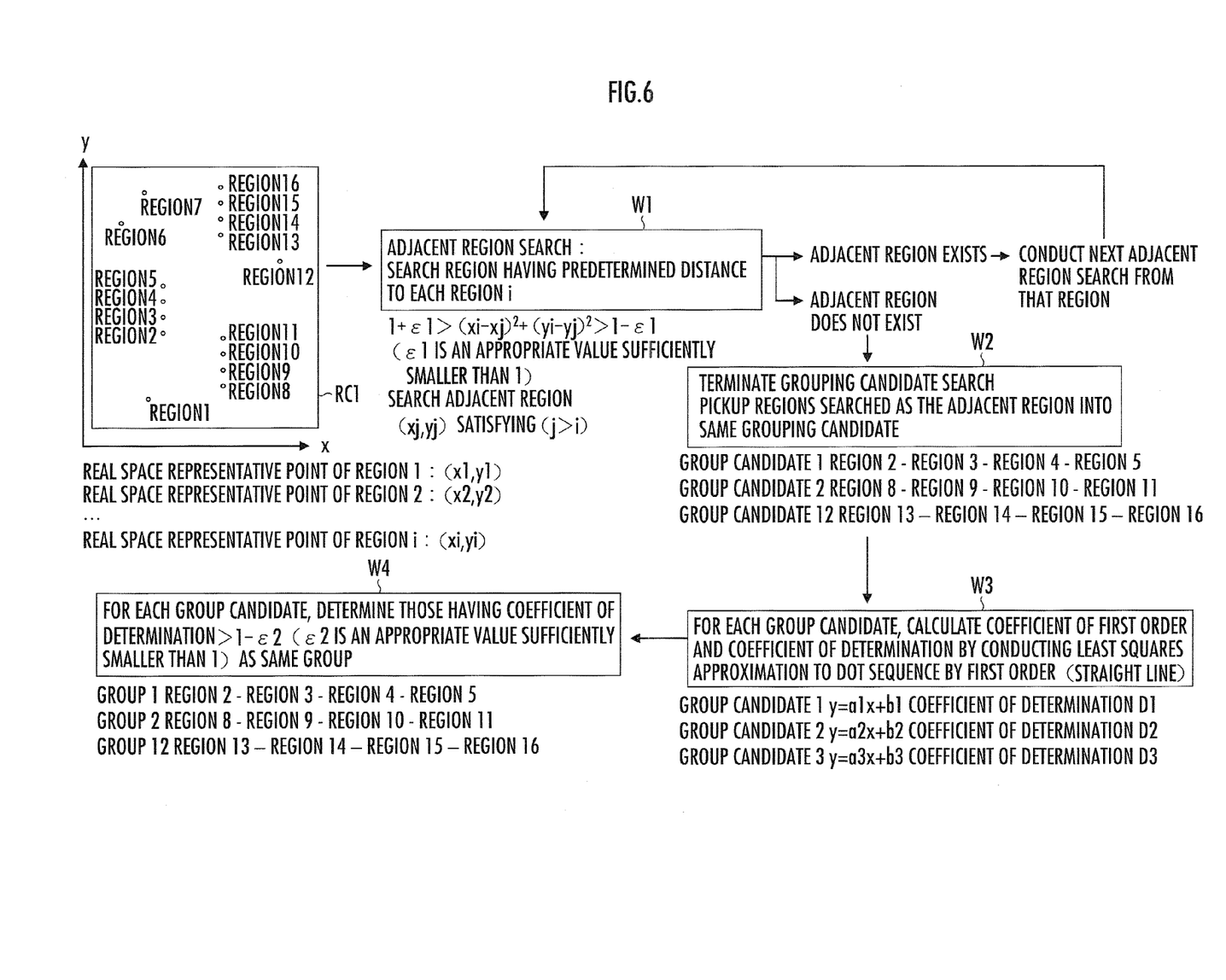
FIG. 6 is an explanatory view of the process of grouping the real space representative point.

The grouping means 14 executes an adjacent region search identified by W1 in FIG. 6 to the real space representative points (x1, y1), (x2, y2), ..., (xi, yi), ..., (x16, y16) of the candidate regions for Botts Dots (region 1 through 16) in the two-dimensional coordinate RC1 (x-y coordinate) in real space calculated by the real space representative point calculating means 13.

In the adjacent region search, a search for the region (adjacent region) j which satisfies the following equation (1) to each region i (i=1, 2, ..., 16) is carried out.

$$1+\epsilon 1 > \sqrt{(xi-xj)^2 (yi-yj)^2} > 1-\epsilon 1 \qquad (1)$$

where ε1 is a set value sufficiently smaller than 1, and i<j≦16.

Then, if there exists an adjacent region, then the next adjacent region search identified by W1 will be conducted to this adjacent region. If there exists no adjacent region, then the search on the first group candidate is terminated. Thereafter, the grouping means 14 carried out search for second, third, ..., sixteenth group candidates to the remaining regions.

As a result of the search for the group candidate mentioned above, three group candidates, i.e., group candidate 1 (region 2, region 3, region 4, region 5), group candidate 2 (region 8, region 9, region 10, region 11), and group candidate 3 (region 13, region 14, region 15, region 16) were searched from RC1 in FIG. 6.

Next, the coefficient of determination calculating means 15 obtains a first order (straight line) which approximates the dot sequence of the real space representative points of the region constituting the group candidate, to each of the group candidates, by using the least squares method. Thereafter, the coefficient of determination calculating means 15 obtains coefficient of determination D1 through D3, that are coefficients indicating the degree of approximation between the dot sequence of the representative points and the obtained approximate expression, for each of the group candidates.

Of the group candidates, the grouping means 14 selects the group having the coefficient of determination larger than 1−ε2 (ε2 is a set value sufficiently smaller than 1), which indicates that the dot sequence of the real space representative points constituting the group candidate is determined to have high linearity, as the group constituted from the real space representative points indicating the position of the Botts Dots. For RC1 in FIG. 6, the group candidates 1 through 3 are selected as groups 1 through 3 constituted from the real space representative points indicating the position of the Botts Dots.

Next, with reference to FIG. 7, the process of verification of the distance between groups and the recognition of the position of the lane marker in STEP 6 through 7 will be explained.

Figure 7:
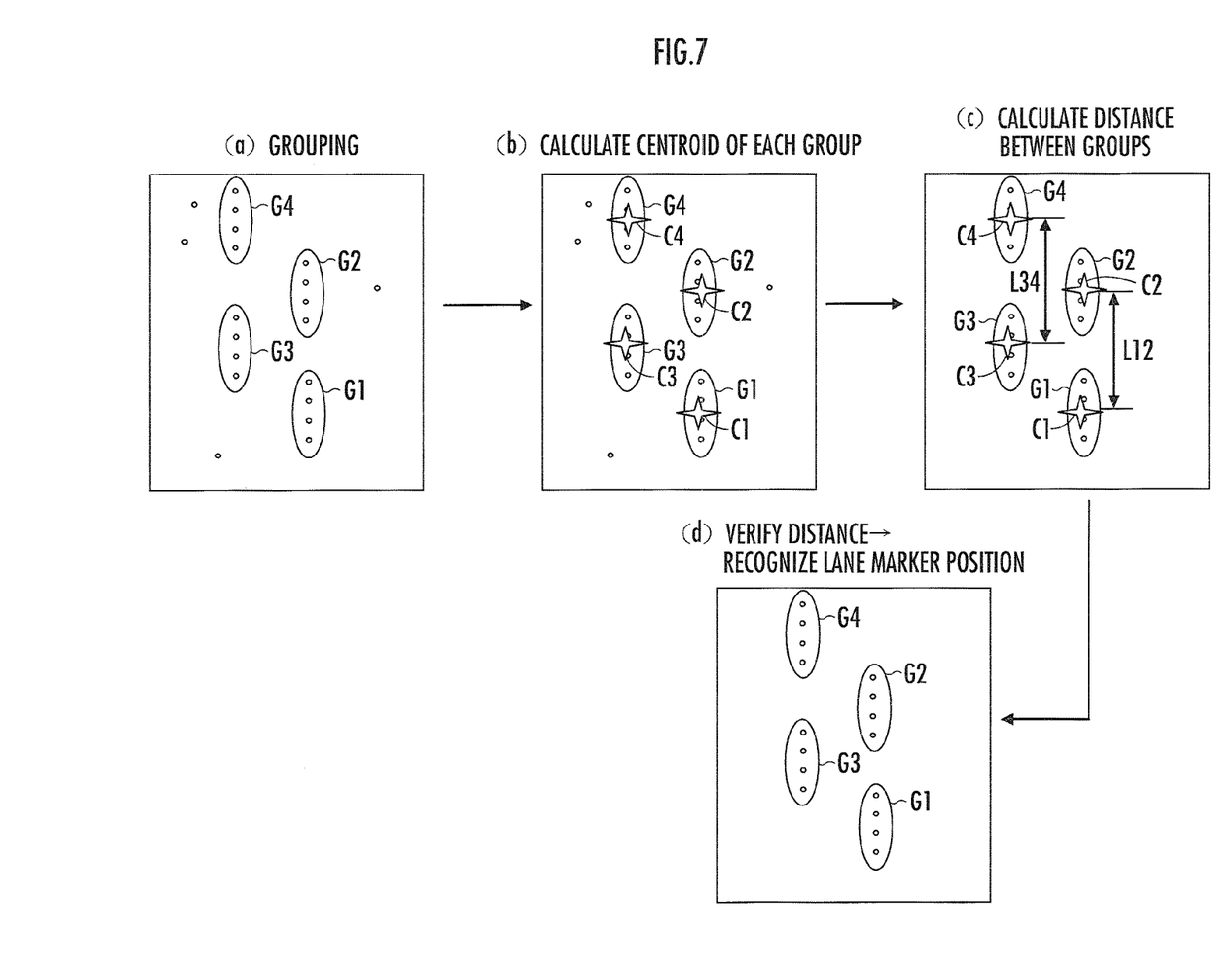
FIG. 7 is an explanatory view of the verification process of the distance between groups and the lane marker recognition process.

In the example shown in FIG. 7, four groups G1 through G4 are selected as shown in (a). Then the group centroid calculating means 16 calculates the centroid C1 through C4 of each group as shown in (b). Here, the centroid coordinate $(x_{ic}, y_{ic})$ of each group can be calculated from the following equation (2) and equation (3), when the coordinates of the representative point constituting the group are $\{(x_{i1}, y_{i1}), (x_{i2}, y_{i2}), (x_{i3}, y_{i3}), (x_{i4}, y_{i4})\}$.

[Equation 2]

$$x_{ic} = \frac{x_{i1} + x_{i2} + x_{i3} + x_{i4}}{4} \qquad (2)$$

[Equation 3]

$$y_{ic} = \frac{y_{i1} + y_{i2} + y_{i3} + y_{i4}}{4} \qquad (3)$$

Then, in the case where the distance $L_{12}$ between the centroid C1 of the right side group G1 and the centroid C2 of the right side group G2 is equal to or greater than a first threshold value and is less than a second threshold value, that are set according to the stipulated value (according to road laws and regulations or the like) of the installation interval of the Botts Dots, the lane marker position recognizing means 17 recognizes the real space representative points constituting the groups G1 and G2 as the position of the Botts Dots.

Similarly, in the case where the distance $L_{34}$ between the centroid C3 of the left side group G3 and the centroid C4 of the left side group G4 is equal to or greater than a first threshold value and is less than a second threshold value, the lane marker position recognizing means 17 recognizes the real space representative points constituting the groups G3 and G4 as the position of the Botts Dots.

By calculating the distance between the groups on the basis of the centroid of the group, the variation on the calculated value of the distance between the groups can be suppressed in the case where the Botts Dots constituting the edge of the group is missing.

In the example shown in FIG. 7, the real space representative points constituting the right side groups G1 and G2 and the real space representative points constituting the left side groups G3 and G4 are both recognized as the positions of the Botts Dots. Therefore, as shown in (d), the lane marker position recognizing means 17 recognizes the right side boundary position of the right side of the traffic lane from the position of the real space representative points constituting the right side groups G1 and G2, and also recognizes the left side boundary position of the left side of the traffic lane from the position of the real space representative points constituting the left side groups G3 and G4.

Thereafter, the vehicle 20 may calculate the clearance between the vehicle 20 and the boundary position of the traffic lane, from the recognition result of the position of the Botts Dots by the lane marker position recognizing means 17, and may carry out steering control of the vehicle 20 or announce to the driver and the like based on the clearance.

In the present embodiment, the lane marker recognizing apparatus which recognizes Botts Dots as the stud-type lane maker of the present invention is explained. However, the present invention may be applied to recognition of other kinds of stud-type lane maker, such as the cat's eye.

Further, in the present embodiment, the linearity of the dot sequence of the real space representative points constituting each group candidate is determined on the basis of the coefficient of determination calculated by the coefficient of determination calculating means 15, and selected the group constituted from the real space representative points corresponding to the position of the Botts Dots. However, the effect of the present invention may be obtained even in the case where this evaluation is not carried out. Moreover, instead of evaluating the linearity, the dot sequence of the real space representative points constituting the group candidate may be approximated using a polynomial equation of second order or more, and the group constituted from the real space representative points corresponding to the position of the Botts Dots may be selected by evaluating the curvature of the dot sequence.

Still further, in the present embodiment, the groups constituted from the real space representative points corresponding to the position of the Botts Dots are selected on the basis of the distance between the centroids of the group candidates, by calculating the centroids of the group candidates. However, the effect of the present invention may be obtained even in the case where the calculation of the distance between the centroids is not carried out.

What is claimed is:

1. A lane marker recognizing apparatus equipped with an image acquiring means for acquiring road image via an imaging means mounted on a vehicle, which recognizes a lane marker discretely provided on the road from the acquired road image, comprising:
    a candidate region extracting means for extracting a region having the possibility of being an image portion of the lane marker, from the road image, as a lane marker candidate region;
    a real space representative point calculating means for determining a representative point of the lane marker candidate region in accordance with a predetermined condition, and calculating a real space position corresponding to the representative point as a real space representative point;
    a grouping means for forming, in the case where a plurality of the real space representative points is calculated, one group of the real space representative points from the plurality of the real space representative points having a relative distance within a predetermined range set according to standards on the lane marker; and
    a lane marker position recognizing means for recognizing the position of the lane marker on the basis of the plurality of the real space representative points formed into the one group of the real space representative points by the grouping means, the lane marker position recognizing means comprising a group representative point calculating means for calculating a group representative point of the group, wherein the lane marker position recognizing means recognizes the position of each lane marker of a plurality of lane markers, in the case where there exists a plurality of groups having a same number of the real space representative points constituting the group and where a distance between the group representative points of the groups is equal to or greater than a first threshold and is less than a second threshold, on the basis of the real space representative points constituting said plurality of the groups.

2. The lane marker recognizing apparatus according to claim 1, wherein the grouping means forms, on condition that the relative distance of the real space representative points is within the predetermined range set according to the standards on the lane marker and that three or more real space representative points are aligned in one direction, one group consisting of the three or more real sp representative points.

3. The lane marker recognizing apparatus according to claim 1, comprising a coefficient of determination calculating means for obtaining a polynomial equation of a predetermined order which approximates a dot sequence of the real space representative points formed into one group by the grouping means to a straight line or a curved line, and calculating a coefficient of determination which is the coefficient indicating the degree of approximation of the dot sequence of the real space representative points by the polynomial equation, and
    the lane marker position recognizing means recognizes the position of each lane marker of a plurality of lane markers, on the basis of a plurality of the real space representative points constituting the group having the coefficient of determination equal to or greater than a predetermined value.

4. The lane marker recognizing apparatus according to claim 1, comprising a group centroid calculating means for calculating a centroid of the group, and
    the lane marker position recognizing means recognizes the position of each lane marker of a plurality of lane markers, in the case where there exists a plurality of groups having a same number of the real space representative points constituting the group and where a distance between the centroid of the groups is equal to or greater than the first threshold and is less than the second threshold, on the basis of the real space representative points constituting said plurality of the groups.

5. The lane marker recognizing apparatus according to claim 1, wherein the real space representative point calculating means sets as the predetermined condition a condition of selecting a pixel having the highest luminance value among pixels constituting each lane marker candidate region as the representative point.

6. The lane marker recognizing apparatus according to claim 1, wherein the real space representative point calculating means sets as the predetermined condition a condition of selecting a pixel constituting a centroid of each lane marker candidate region as the representative point.

7. A vehicle equipped with an imaging means and an image acquiring means for acquiring road image via the imaging means, which recognizes a lane marker discretely provided on the road from the road image, comprising:
    a candidate region extracting means for extracting a region having the possibility of being an image portion of the lane marker, from the road image, as a lane marker candidate region;
    a real space representative point calculating means for determining a representative point of the lane marker candidate region in accordance with a predetermined condition, and calculating a real space position corresponding to the representative point as a real space representative point;
    a grouping means for forming, in the case where a plurality of the real space representative points are calculated, one group of the real space representative points from the plurality of the real space representative points having a relative distance within a predetermined range set according to standards on the lane marker; and
    a lane marker position recognizing means for recognizing the position of the lane marker on the basis of the plurality of the real space representative points formed into the one group of the real space representative points by the grouping means, the lane marker position recognizing means comprising a group representative point calculating means for calculating a group representative point of the group, wherein the lane marker position recognizing means recognizes the position of each lane marker of a plurality of lane markers, in the case where there exists a plurality of groups having a same number of the real space representative paints constituting the group and where a distance between the group representative points of the groups is equal to or greater than a first threshold and is less than a second threshold, on the basis of the real space representative points constituting said plurality of the groups.

* * * * *